UNITED STATES PATENT OFFICE.

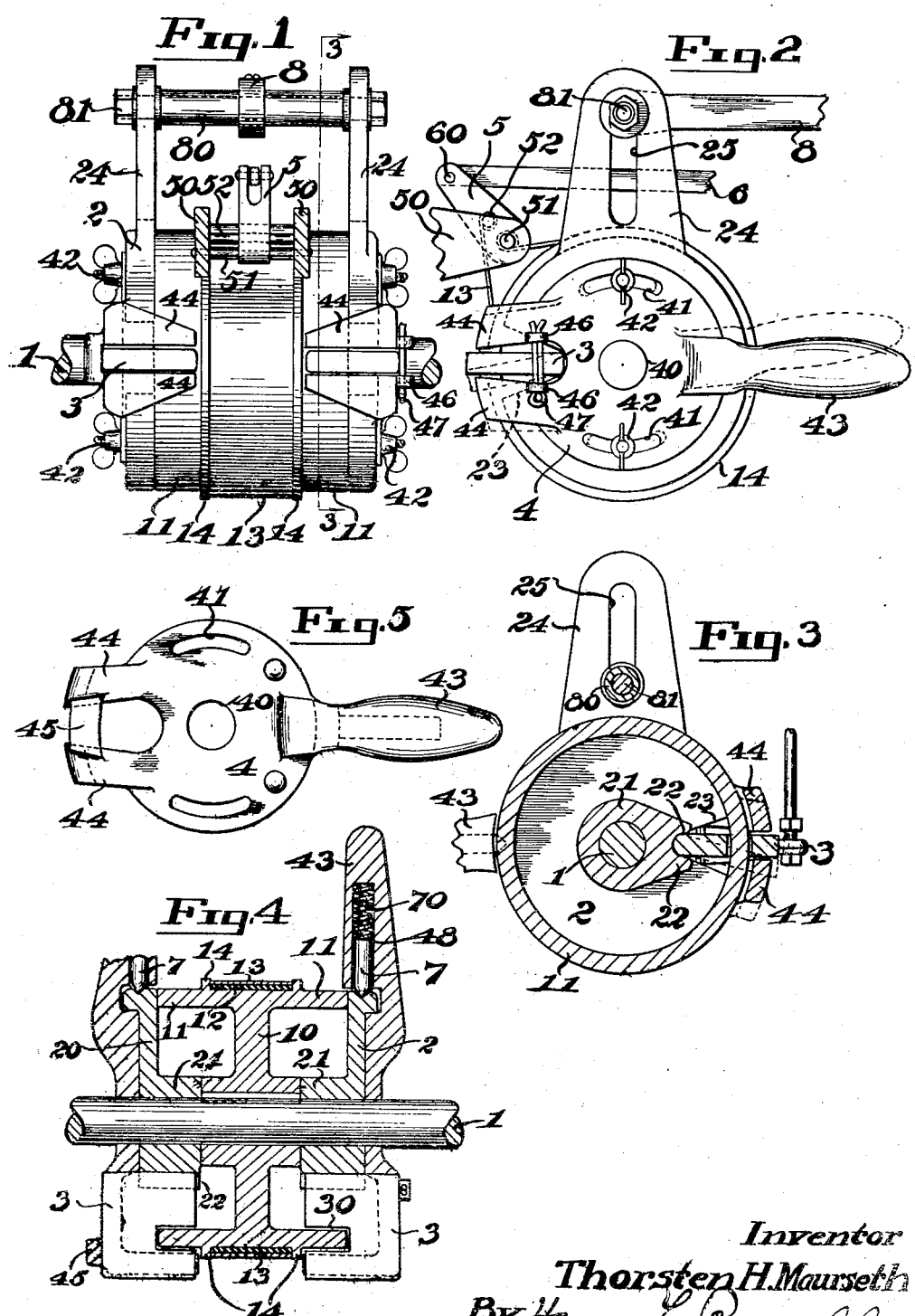

THORSTEN H. MAURSETH, OF SEATTLE, WASHINGTON, ASSIGNOR OF ONE-HALF TO LOUIS BEIRL, OF PORTLAND, OREGON.

CLUTCH DRIVING DEVICE.

1,246,295.  Specification of Letters Patent.  Patented Nov. 13, 1917.

Application filed January 18, 1917. Serial No. 143,038.

*To all whom it may concern:*

Be it known that I, THORSTEN H. MAURSETH, a citizen of the United States, and resident of the city of Seattle, county of King, and State of Washington, have invented certain new and useful Improvements in Clutch Driving Devices, of which the following is a specification.

My invention relates to devices which are employed for intermittently actuating rotative devices and consists of a combination of clutch and brake mechanisms whereby a rotative device may be actuated and whereby the same may be permitted to run backward under the controlling influence of a brake.

The object of my invention is to provide a clutch mechanism which may be used for such purposes as the turning of a shaft, as for instance, the shaft of a hoisting drum, whereby the shaft may be operated a step at a time and whereby, when desired, the actuating mechanism may be released and the load which was lifted by the shaft may be eased back or permitted to run down, either slowly or fast, as desired.

My invention comprises the novel parts and combinations of parts which will be hereinafter described and particularly pointed out in the claims.

In the accompanying drawings I have shown my device in the form of construction which is now preferred by me, and as it might be employed in connection with a hoisting apparatus. The device is, however, adapted for other purposes and uses than for operating a hoist.

Figure 1 is a side view of the device as mounted upon a shaft.

Fig. 2 is an end view of the same device.

Fig. 3 is a section taken upon the line 3—3 of Fig. 1.

Fig. 4 is a longitudinal section taken through the axis of the device.

Fig. 5 is a face view of the type of adjusting member which is shown in the other drawings.

In the drawings 1 represents the shaft which is to be turned. This may be connected with any apparatus which it is desired to turn by a device of this sort. Secured upon this shaft is the driven member 10. In the double acting device herein shown this member would be provided with end facing flanges 11 which are concentric with the axis. In cases where a brake is to be combined with the clutch mechanism, this may be conveniently done by providing a central zone 12, with which a brake may be engaged. As herein shown the type of brake employed is a band brake consisting of the band 13, having one end secured upon the pin 51 carried by fixed arms 50, and upon which is mounted the brake lever 5, which brake lever carries a pin 52 to which the other end of the brake band 13 is secured. This brake lever may be actuated in any suitable manner, as for instance, by means of a rod 6 connected thereto by the pivot 60 and extending to any convenient point.

Associated with each of the flanges 11 is a driving member 2. This is herein shown as being in the form of a disk which is provided with an actuating handle 24 and which is mounted concentrically with the flange 11. As shown, this is loosely mounted upon the shaft 1, and has a hub 2 projecting under or within the flange 11.

A dog 3 is provided with a notch 30, by which it may be slipped over to embrace the flange 11. The notch in the dog 3 is of such width that it may rock slightly upon the flange and, when rocked a sufficient amount, will engage the flange by two opposite corners, so as to bite and grip the flange securely. The inner end of this dog is placed within a notch or groove which lies between the two projections 22 extending from the hub 21. If the driving member 2 be oscillated about its pivot it will rock the dog 3 sufficiently to cause it to bite the flange 11 and will thereafter carry the flange and the driven member 10 with it. Upon reversal of the driving member 2, the flange will be released, and if the rocking of the dog in the opposite direction be restrained, so that it cannot grip the flange 11, the driving member will move in a backward direction without engaging the driven member.

Mounted upon the driving member 2 is a dog controlling member. This is adjustable in an angular direction so as to engage it with either side of the dog desired to prevent the dog rocking in this direction a sufficient amount to cause it to bite the flange 11 and yet permit rocking in the opposite direction enough to cause it to bite the flange when moved in this direction.

This device is herein shown as a disk 4, which is provided with segmental slots 41 through which project clamping bolts 42 which are upon the driven member. This is provided with two arms 44 extending outwardly at opposite sides of the dog and having their outer ends laterally bent so as to extend over the outer surface of the flange 11. These lie at opposite sides of the dog 3 and are separated sufficiently to provide a certain amount of slack or play between the parts.

By adjusting this plate angularly it will prevent biting of the dog upon the flange when moved in one direction and permit its biting when moved in the other direction. By opposite adjustment of this controlling member, opposite results may be obtained. By placing the same in a central position it will prevent biting of the dog in either direction.

For convenience of such adjustment I have shown this member provided with a handle 43. For convenience in adjusting this member in a central or neutral position, I have shown the handle 43 as bored and a catch 7 placed in this bore and normally projected by spring 70. The periphery of the actuating member 2 is provided with recesses adapted to receive a pointed end of the member 7 and thereby to hold the device in central position, even if the bolts 42 are not clamped, and indicating when the device is in a central position for convenience of setting.

I have shown the controlling plate 4 as provided with a notch between the two arms 44 whereby the dog 3 may be readily removed or placed in position by sliding the same axially. While this construction is not an essential one, it is convenient when desired to remove or replace the dog. In Fig. 2 I have shown this controlling member as provided with ears 46, located at opposite sides of the side notch through which a cotter pin, as 47 may be passed, to thereby hold the dog in place. In the same device, as shown in Fig. 5, a bar 45, which is an integral part of the member 4, is shown as extending across the face of the dog to thereby hold it in place. When this construction is used, the dog cannot, however, be removed except by sliding the plate 4 to one side.

The driving members 2, as herein shown, have their arms 24 provided with a slot 25, in which is placed a bolt 81, upon which is journaled the pivot head 80 of an actuating rod 8. This rod is herein shown simply as illustrative of one means which may be employed for actuating the device. Any other means found suitable may, however, be employed as a substitute therefor. When the brake band is mounted upon the device in the manner herein shown it is desirable to provide flanges 14, which will retain the brake band in position and prevent its shifting axially.

By providing two of the clutch mechanisms, such as has been described, these may be set so that one will bite when moving in one direction and the other for movement in the opposite direction. It is, therefore, possible to secure a rotative effect by movement of the arms 24 in each direction. If, however, the load is very heavy and it is thought that one clutch device might not be strong enough, both may be set to bite for movement in the same direction.

In this case backward movement of the device may be prevented by any of the expedients commonly employed for such purposes, or this may be secured by intermittent actuation of the brake, the brake in this case serving as the means for preventing backward movement. By setting the dog-controlling devices, the application of power to the shaft may be such as will turn it in whichever direction is desired.

What I claim as my invention:

1. An intermittent driving mechanism comprising a rotative driven member having a flange concentric with its axis, a driving member mounted for free movement about the axis, a dog having a notch embracing said flange and having an end engaged to turn with the driving member, and a dog-controlling member mounted for angular adjustment upon the driving member and having parts loosely embracing said dog.

2. An intermittent driving mechanism comprising a rotative driven member having a flange concentric with its axis, a driving member mounted upon a common axis therewith and having a hub inward from said flange, a driving dog having a notch embracing said flange, said hub of the driving member having a notch receiving an end of said dog, a dog controlling member comprising a plate angularly adjustable on the driving member and having fingers loosely embracing the outer part of the dog.

3. An intermittent driving mechanism comprising a rotative driven member having a flange concentric with its axis, a driving member mounted upon a common axis therewith and having a hub inward from said flange, a driving dog having a notch embracing said flange, said hub of the driving member having a notch receiving an end of said dog, a dog controlling member comprising a plate angularly adjustable on the driving member and having fingers loosely embracing the outer part of the dog, said controlling plate having a notch permitting removal of the dog in an axial direction, and a restraining member carried by said plate to prevent removal of the dog.

4. An intermittent driving mechanism comprising a driven member having a projecting concentric flange at each end, a driving dog for each end having a notch embracing each its respective flange, a driving member for each end having actuating engagement, each with its respective dog, and controlling members secured to said driving members for angular adjustment thereon and having fingers adapted to engage the dog to control their engagement, and a common actuating member for both of said driving members.

5. An intermittent driving mechanism comprising a rotative driven member having a braking surface and a concentric cylindrical flange, a brake engaging said surface, a driving member pivoted concentric with said flange, and a dog having a notch adapted to receive said flange, one end of said dog and the driving member having actuating engagement, a dog controlling member concentrically pivoted upon the driving member and having fingers loosely embracing the dog, and means for securing said controlling member in adjusted position.

6. An intermittent driving mechanism comprising a rotative driven member having a flange, a driving member pivoted concentric with the driven member, a dog having a notch embracing said flange and itself actuated by the driving member, a controlling member angularly adjustable on the driving member and means carried by said controlling and driving members for indicating and holding the controlling member in neutral position.

Signed at Seattle, Washington, this 10th day of January, 1917.

THORSTEN H. MAURSETH.

Copies of this patent may be obtained for five cents each, by addressing the "Commissioner of Patents, Washington, D. C."